United States Patent
Zanella et al.

(10) Patent No.: US 7,282,838 B2
(45) Date of Patent: Oct. 16, 2007

(54) ELECTRICAL ENERGY GENERATOR DEVICE WITH MICRO-FAN ARRAY

(75) Inventors: Alessandro Zanella, Turin (IT); Francesco Butera, Turin (IT); Piero Perlo, Sommariva Bosco (IT); Stefano Alacqua, Rivoli Cascine Vica (IT); Marco Biasiotto, Turin (IT); Andrea Perosino, Orbassano (IT)

(73) Assignee: CRF Societa Consortile per Azioni, Turin (IT)

( * ) Notice: Subject to any disclaimer, the term of this patent is extended or adjusted under 35 U.S.C. 154(b) by 81 days.

(21) Appl. No.: 10/518,049

(22) PCT Filed: Dec. 23, 2003

(86) PCT No.: PCT/IB03/06374

§ 371 (c)(1),
(2), (4) Date: Dec. 16, 2004

(87) PCT Pub. No.: WO2004/068606

PCT Pub. Date: Aug. 12, 2004

(65) Prior Publication Data
US 2006/0012264 A1 Jan. 19, 2006

(30) Foreign Application Priority Data
Jan. 31, 2003 (IT) .................. TO2003A0058

(51) Int. Cl.
*H01L 41/08* (2006.01)
(52) U.S. Cl. .................................................... 310/339
(58) Field of Classification Search ................ 310/339, 310/338, 322, 334, 342, 328, 323.02, 358, 310/359, 367, 366, 311; *H01L 41/08*
See application file for complete search history.

(56) References Cited

U.S. PATENT DOCUMENTS

| | | | | |
|---|---|---|---|---|
| 2,709,104 A | * | 5/1955 | Gibbs | 310/66 |
| 4,704,711 A | * | 11/1987 | Gerard et al. | 360/41 |
| 5,223,763 A | * | 6/1993 | Chang | 310/339 |
| 6,011,346 A | | 1/2000 | Buchanan et al. | |

* cited by examiner

*Primary Examiner*—Darren Schuberg
*Assistant Examiner*—Karen Beth Addison
(74) *Attorney, Agent, or Firm*—Sughrue Mion, PLLC

(57) ABSTRACT

An electrical energy generator device comprising an array of micro-fans each associated to a respective dynamo-electric generator by means of a respective connecting shaft, further comprises, for at least some of the micro-fans (3), a lug element (6) associated to the respective connecting shaft (4) which mechanically co-operates at each revolution with a piezoelectric element (7), for the production of additional electrical energy. In addition or instead of the aforesaid arrangement, it is possible to provide plates (10) made of piezoelectric material which vibrate in the flow of air that invests them, thereby producing electrical energy.

2 Claims, 2 Drawing Sheets

ELECTRICAL ENERGY GENERATOR DEVICE WITH MICRO-FAN ARRAY

This is a National Stage entry of International Application PCT/IB2003/006374, with an international filing date of Dec. 23, 2003, which was published as WO 2004/068606 A1, and the complete disclosure of which is incorporated into this application by reference.

TITLE OF THE INVENTION

The present invention relates to an electrical energy generator device, comprising an array of micro-fans, each associated to a respective dynamo-electric generator by means of a connecting shaft.

BACKGROUND OF THE INVENTION

A device of the kind described above has been the subject of the previous patent application No. TO2001A000386 of Apr. 20, 2001 by the same Applicant. The previously proposed device was applicable both to a motor vehicle, where the relative wind generated by the motion of the motor vehicle can be exploited to actuate the rotation of the micro-fans with the consequent generation of electrical energy, and in general as a stationary generator device actuated by wind energy, for instance to energise the lighting of road signs or the like.

Studies and experiments conducted by the Applicant have shown that the previously proposed device has the advantage of allowing to generate electrical energy even at low or very low velocities of rotation of the micro-fans. On the other hand, in the case of high velocities of rotation, the generation of electrical energy can be limited to a certain extent by the fact that dynamo-electrical generators undergo a saturation phenomenon above a threshold velocity.

BRIEF SUMMERY OF THE INVENTION

The object of the present invention is further to enhance the previously proposed device, overcoming the aforementioned drawback.

In view of achieving said object, the invention relates to a device of the type described above, characterised in that at least some of the micro-fans are connected to the respective dynamo-electric generator devices by means of shafts, each of which bears at least a lug element able to co-operate mechanically at each revolution with a piezoelectric element which produces additional electrical energy.

The arrangement of the piezoelectric elements allows to produce electrical energy in particularly efficient fashion at the high velocities of rotation of the micro-fans.

According to an additional preferred characteristic of the invention, the aforesaid piezoelectric element is constituted indifferently by a piezoelectric polymer or by a piezoelectric ceramic.

Further features and advantages of the invention shall become more readily apparent from the description that follows with reference to the accompanying drawings, provided purely by way of non limiting example in the accompanying drawings, in which:

DETAILED DESCRIPTION OF THE INVENTION

Figure 1:
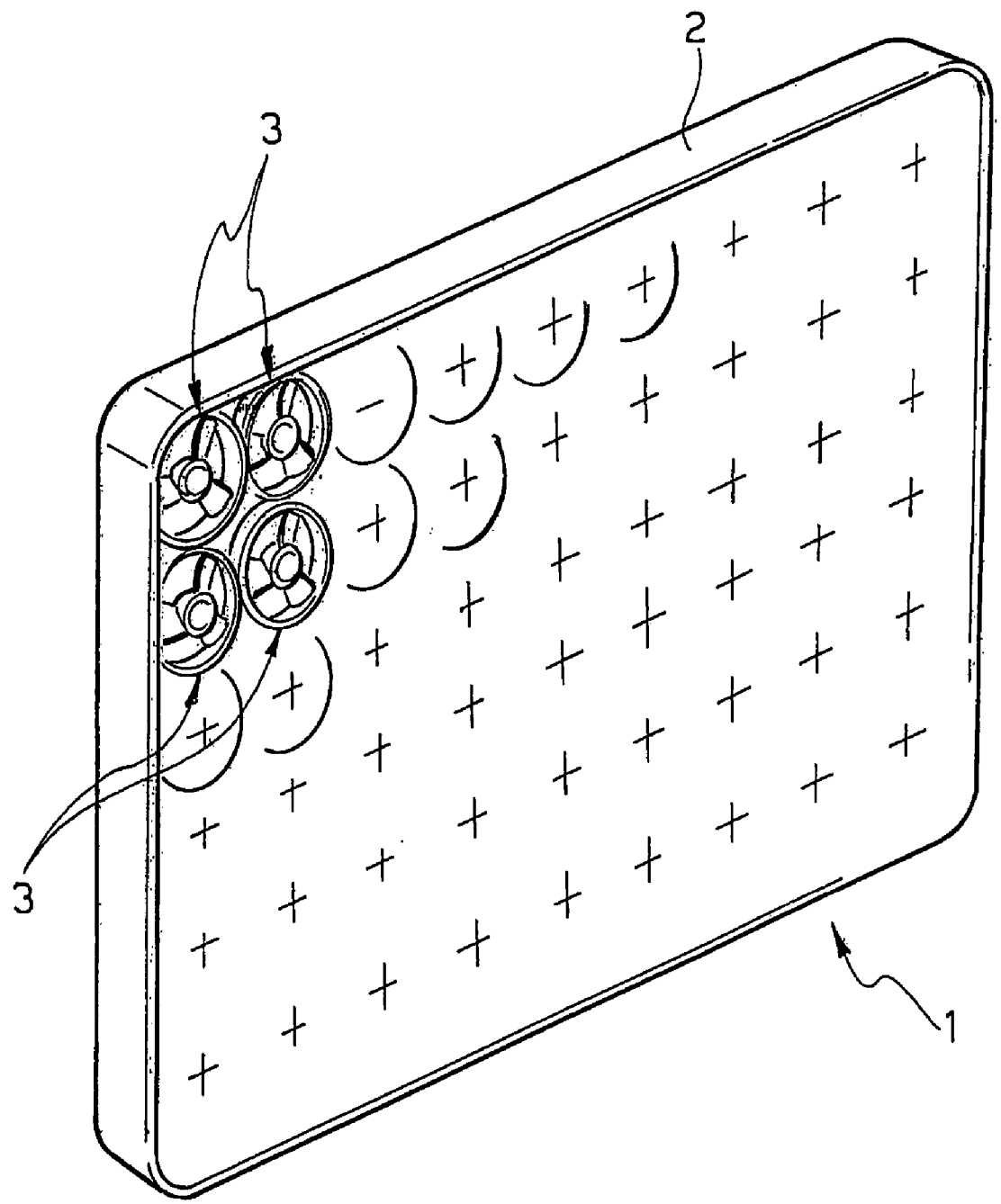
FIG. 1 is a perspective view of a generator device comprising an array of micro-fans.
Figure 2:
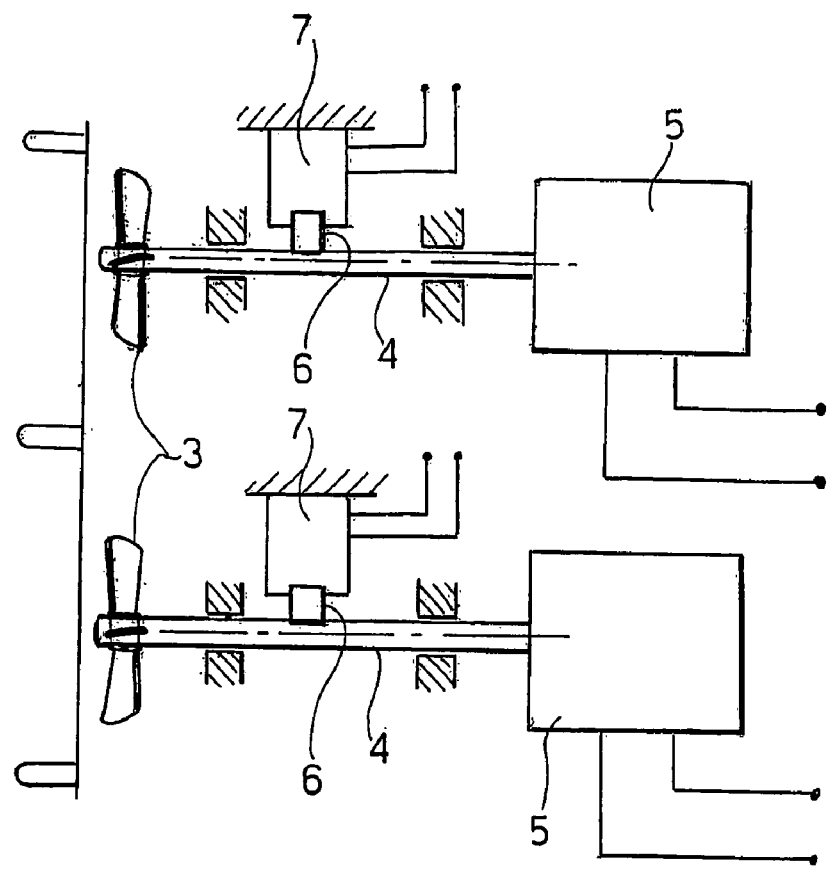
FIG. 2 is a schematic sectioned view of a device according to the invention, showing the details of the connection between a micro-fan and the related dynamo-electric current generator and of the lug element associated with the shaft and co-operating with the piezoelectric element.

In FIG. 1, the reference number 1 globally designates a generator device comprising a support structure in which are pivotally mounted a plurality of micro-fans 3, arranged in a matrix. With reference to FIG. 2, each micro-fan is mechanically connected by a shaft 4 to a dynamo-electric generator 5 for the production of electrical energy. According to the invention, on the shaft 4 is also mounted a lug element 6 which, rotating with the shaft 4, comes in contact at each revolution with a piezoelectric converter 7 which is thereby mechanically stressed and consequently determines the production of additional electrical energy.

As was previously mentioned, the array arrangement of the micro-fans allows to generate electrical energy in particularly efficient fashion by means of the generators 5 at low velocities of rotation of the micro-fans, whilst said production is, in itself, relatively limited at high velocities, due to the saturation of the generators 5. The piezoelectric polymers 7 enable to overcome said limitation, because they enable to produce electrical energy in particularly efficient fashion at high velocities of rotation.

Figure 3:
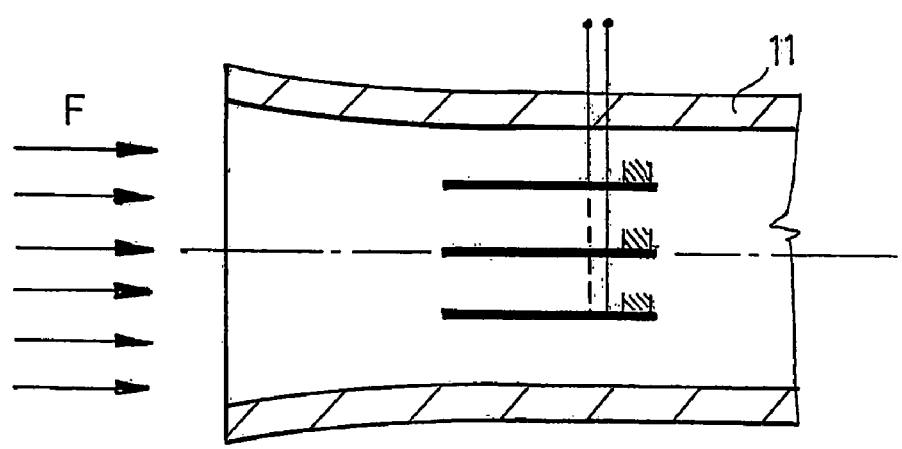
FIG. 3 is a cross-sectional view of the conveying conduit, according to another aspect of the invention.

FIG. 3 shows an additional solution which is also comprised in the present invention in which no micro-fans but solely a plurality of plates of piezoelectric material 10 which are positioned in the direction of a flow of air F in a conveying conduit 11. The flow of air F causes a vibration of the piezoelectric plates 10 which consequently causes the production of electrical energy.

Naturally, it would be possible to provide a generator device in which the piezoelectric plates 10 are used in parallel with the utilisation of the micro-fans described above.

Naturally, without altering the principle of the invention, the construction details and the embodiments may vary widely from what is described and illustrated purely by way of example herein, without thereby departing from the scope of the present invention.

The invention claimed is:

1. An electrical energy generator device, comprising an array of micro-fans (3) each associated to a dynamo-electric generator (5) by means of a respective connecting shaft (4), characterised characterized in that for at least some of the micro-fans (3), the connecting shaft (4) is provided with a lug element (6) which mechanically co-operates at each revolution with a piezoelectric element, for the production of additional electrical energy.

2. A generator device as claimed in claim 1 characterised characterized in that the piezoelectric element is a piezoelectric polymer or a piezoelectric ceramic.

* * * * *